March 2, 1954  J. F. OGDEN  2,670,535
MUFFLER AND TAIL PIPE TOOL
Filed May 26, 1950

INVENTOR.
JOHN F. OGDEN
BY
McMorrow, Berman & Davidson
ATTORNEYS

Patented Mar. 2, 1954

2,670,535

UNITED STATES PATENT OFFICE 2,670,535

MUFFLER AND TAIL PIPE TOOL

John F. Ogden, Wooster, Ohio

Application May 26, 1950, Serial No. 164,525

1 Claim. (Cl. 30—91)

This invention relates to cutting tools, and more particularly to an improved cutting tool especially adapted for use in removing old, worn out mufflers from tail pipes and exhaust pipes.

A main object of the invention is to provide a novel and improved cutting tool especially useful in removing mufflers from tail pipes and exhaust pipes, said tool being very simple in construction, being easy to operate, and providing a great saving in time and effort in removing mufflers from tail pipes and exhaust pipes.

A further object of the invention is to provide an improved cutting tool for use in removing mufflers from tail pipes and the like, said cutting tool being very inexpensive to manufacture, being sturdy in construction, and greatly simplifying the task of removing a worn out muffler from a tail pipe without injury to the tail pipe.

Further objects and advantages of the invention will become apparent from the following description and claim, and from the accompanying drawings, wherein:

Figure 1:
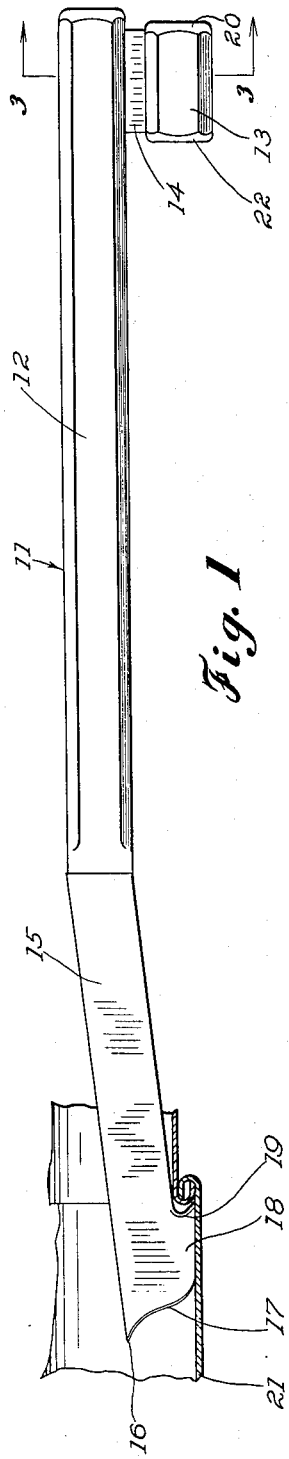
Figure 1 is a side elevational view of an improved cutting tool constructed in accordance with the invention.

Referring to the drawings, the tool is designated generally at 11 and comprises an elongated handle portion 12 of hexagonal cross-section to the rear end of which is secured a short striking head section 13 of similar cross-section, said head 13 being secured parallel to the handle portion 12 and welded or otherwise rigidly secured thereto by an intervening connecting element 14.

Figure 2:
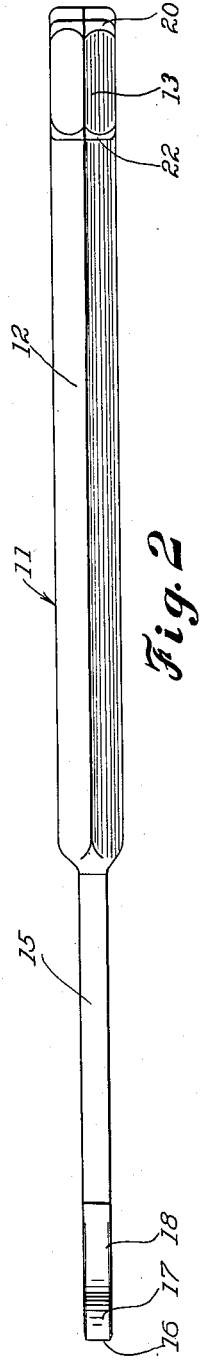
Figure 2 is a bottom plan view of the improved cutting tool of Figure 1.
Figure 4:
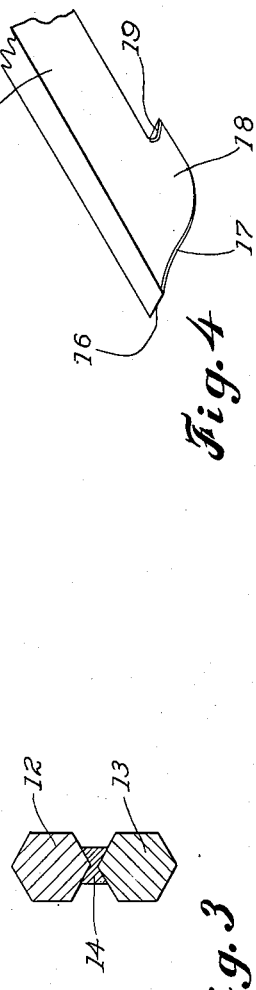
Figure 4 is a fragmentary perspective detail view of the cutting end portion of the improved tool of Figures 1 to 3.
Figure 3:
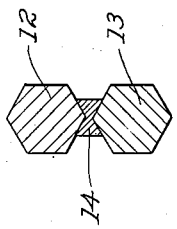
Figure 3 is a cross-sectional view taken on line 3—3 of Figure 1.

Designated at 15 is a blade portion of reduced thickness as compared with the handle portion 12 and integrally connected with said handle portion. As shown in Figure 2, the blade portion 15 is in the same longitudinal plane as the handle portion 12, but is inclined with respect to said handle portion, as shown in Figure 1. As further shown in Figure 2, the blade portion 15 and the striking head portion 13 are in the same longitudinal plane. The end of the blade portion 15 is formed with a pointed tip 16 which terminates a sinuously curved cutting edge portion 17. The end of the blade 15 is formed with an offset extension or enlargement 18, said enlargement having a curved, rearwardly facing margin shown at 19. The edges of the margin 19 are sharpened to define cutting edges, as are the edges of the sinuously curved forward surface 17 of the blade.

In using the device, forward cutting action is obtained by striking the rearwardly facing surface, shown at 20, of the striking head 13. When it is necessary to provide rearward cutting action inside a muffler, as shown in Figure 1, wherein the muffler is designated at 21, for the purpose of cutting away the retaining flange of the muffler, rearward striking force is provided on the tool by striking the forwardly facing surface 22 of the striking head 13. It will be seen from Figure 1 that due to the inclination of the blade 15 with respect to the handle portion 12, the axis of the striking force, when said force is applied either to the surface 20 or to the surface 22, is substantially aligned with the cutting edges at the forward surface 17 of the blade, or at the rear surface 19. This greatly increases the efficiency of the tool and enables the retaining flanges of mufflers or other parts thereof to be severed with a minimum amount of effort and with a minimum amount of injury to the tail pipe or other member to which the muffler is secured.

While a specific embodiment of an improved cutting tool for use in removing old mufflers from tail pipes or other portions of a motor vehicle has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A cutting tool of the character described comprising an elongated straight rigid shank, a substantially flat arm rigidly secured to one end portion of said shank, the longitudinal axis of said arm being inclined at an obtuse angle to the longitudinal axis of said shank, the major surfaces of the arm being in planes parallel to the axis of the shank, said arm being formed with an enlarged flat head at its end coplanar with the remainder of the arm, a cutting element on said head, a transverse cutting edge on said element, and a striking member arranged in spaced parallel relation to and being rigidly secured to the other end portion of said shank, said striking member being spaced from the shank so as to be substantially in longitudinal alignment with said cutting element.

JOHN F. OGDEN.

References Cited in the file of this patent

UNITED STATES PATENTS

| Number | Name | Date |
|---|---|---|
| 376,166 | Schooley | Jan. 10, 1888 |
| 483,588 | Sunderlin | Oct. 4, 1892 |
| 706,107 | Prentiss | Aug. 5, 1902 |
| 730,781 | Mitchell | June 9, 1903 |
| 853,367 | Malory | May 14, 1907 |
| 1,418,125 | Carroll | May 30, 1922 |
| 2,250,434 | Dugaw | July 22, 1941 |
| 2,542,582 | Schwork | Feb. 20, 1951 |

FOREIGN PATENTS

| Number | Country | Date |
|---|---|---|
| 283,366 | Great Britain | Jan. 12, 1928 |